(12) United States Patent
Oliver

(10) Patent No.: US 7,037,062 B2
(45) Date of Patent: May 2, 2006

(54) TRUCK HAVING AN EXTENDABLE AND RETRACTABLE TRUCK BED TO RECEIVE TRUCK BOXES OF DIFFERENT LENGTHS AND METHOD OF OPERATION THEREOF

(75) Inventor: Craig Leslie Oliver, St. George Brant (CA)

(73) Assignee: On-Trux Limited, Ayr (CA)

( * ) Notice: Subject to any disclaimer, the term of this patent is extended or adjusted under 35 U.S.C. 154(b) by 0 days.

(21) Appl. No.: 10/654,048

(22) Filed: Sep. 4, 2003

(65) Prior Publication Data

US 2004/0042883 A1 Mar. 4, 2004

Related U.S. Application Data

(62) Division of application No. 09/850,084, filed on May 8, 2001, now Pat. No. 6,641,353.

(51) Int. Cl.
*B60P 1/04* (2006.01)
(52) U.S. Cl. .............. 414/478; 414/480; 414/494; 414/500
(58) Field of Classification Search ........ 414/477–480, 414/494, 498–500; 280/DIG. 8, 482, 656; 296/168, 170, 171, 181, 182
See application file for complete search history.

(56) References Cited

U.S. PATENT DOCUMENTS

| 2,867,339 | A |   | 1/1959  | Nelson |          |
|-----------|---|---|---------|--------|----------|
| 3,049,378 | A |   | 8/1962  | Nelson |          |
| 3,362,552 | A | * | 1/1968  | Thiele | 414/469  |
| 3,399,795 | A |   | 9/1968  | Clucker et al. | |
| 3,473,679 | A | * | 10/1969 | Weichel | 414/522 |
| 3,722,948 | A |   | 3/1973  | Walsh et al. | |
| 4,096,960 | A | * | 6/1978  | Gilmore | 414/482 |
| 4,645,406 | A |   | 2/1987  | Cooper et al. | |
| 4,737,063 | A |   | 4/1988  | Van den Pol | |
| 4,750,855 | A | * | 6/1988  | Anderson | 414/498 |
| 4,802,811 | A |   | 2/1989  | Nijenhuis | |
| 4,840,532 | A |   | 6/1989  | Galbreath | |
| 5,133,633 | A |   | 7/1992  | Grata | |
| 5,192,189 | A |   | 3/1993  | Murata et al. | |
| 5,246,330 | A |   | 9/1993  | Marmur et al. | |
| 5,467,827 | A | * | 11/1995 | McLoughlin | 169/24 |
| 5,785,485 | A |   | 7/1998  | Hall | |
| 5,934,860 | A |   | 8/1999  | Hotte | |
| 5,984,340 | A |   | 11/1999 | Briscese | |
| 6,176,672 | B1 |  | 1/2001  | Egan et al. | |
| 6,199,894 | B1 | * | 3/2001 | Anderson | 280/638 |
| 6,390,761 | B1 |  | 5/2002  | Palmer et al. | |
| 6,417,292 | B1 |  | 7/2002  | Calcote et al. | |
| 6,547,506 | B1 | * | 4/2003 | Jacob | 414/498 |
| 2002/0164239 | A1 | | 11/2002 | Angermeier | |

FOREIGN PATENT DOCUMENTS

CA 1245185 11/1988

* cited by examiner

*Primary Examiner*—James W. Keenan
(74) *Attorney, Agent, or Firm*—Anissimoff & Associates

(57) ABSTRACT

A truck has an extendable and retractable truck bed for receiving removable and replacing truck boxes of different lengths. The truck bed can be extended or retracted to fit the size of the truck box. The truck bed has movable supports that can be extended or retracted from inside or outside a cab to support the appropriate length of the truck box. The movable supports also act as guide means to guide the truck box onto or off of the truck bed. In a method of extending or retracting the truck bed, a single truck can be used to mount or remove truck boxes of different sizes.

11 Claims, 19 Drawing Sheets

TRUCK HAVING AN EXTENDABLE AND RETRACTABLE TRUCK BED TO RECEIVE TRUCK BOXES OF DIFFERENT LENGTHS AND METHOD OF OPERATION THEREOF

CROSS-REFERENCE TO RELATED APPLICATIONS

This application is a division of U.S. Ser. No. 09/850,084 filed on May 8, 2001 and issued under U.S. Pat. No. 6,641,353 on Nov. 4. 2003.

FIELD OF THE INVENTION

This invention relates to a truck with an extendable truck bed and boxes of different lengths. The boxes are readily removable and replaceable successively together with a method of operation thereof.

BACKGROUND OF THE INVENTION

Trucks with removable and replaceable boxes are known. However, previously known embodiments suffer from one or more disadvantages in that the truck bed cannot accommodate boxes of different lengths; or, the truck bed cannot be extended or retracted to correspond to the length of the box; or, the box is not easily removable and replaceable; or, there is a large gap between the rear of the cab and the front of the box; or, the floor of the box is too high off the ground when the box is loaded on the truck bed in an operating position, thereby causing the truck to have a high centre of gravity; or, the truck is relatively unstable when a box is mounted on the truck bed; or, the box overhangs the truck frame by a substantial amount, thereby greatly reducing the weight on the front wheels on the truck and making the truck difficult to turn; or, the floor of the truck box is not located above a winch; or, the truck with the removable box does not have the same handling capability as a truck with a box that is fixed in position; or, except for connecting or disconnecting the cable, the procedure for unloading a box cannot be controlled from inside the cab of the truck; or, previous trucks are much too expensive or complex.

In one known embodiment, the truck bed has a crane permanently mounted thereon and the crane moves the box onto or off of the truck bed. These trucks are extremely expensive to manufacture. Alternatively, a truck bed can have mounting arms thereon that engage two sides of a truck box for moving the truck box onto the bed or off of the bed. Some previous trucks have boxes that are removed off the side of the truck bed.

SUMMARY OF THE INVENTION

It is an object of the present invention to provide a truck having a number of boxes of different lengths that can be successively mounted on the truck and easily removed and replaced.

A truck has an extendable and retractable truck bed to receive truck boxes of different lengths. The truck has a cab and a truck bed located to the rear of the cab. The bed has a raised central portion extending longitudinally. The central portion supports a frame that is connected to a rear of the central portion at a pivot point. At least one hydraulic cylinder extends between the central portion and the frame. The cylinder is capable of tilting the frame rearward relative to the central portion. The truck bed has a winch with an extendable and retractable cable mounted thereon. The truck bed has a truck box removably mounted on the frame. The box having attachment means thereon to receive the cable. The frame has guide means thereon and the box has guide means thereon corresponding to the guide means on the frame. The guide means are oriented so that the box can slide from front to rear and vice versa relative to the frame. The frame has two movable supports that can be extended and retracted longitudinally, the movable supports extending or retracting a length of the truck bed. The movable supports support the truck box when the truck box exceeds a minimum length of the truck bed. The length of the truck bed substantially corresponds to the length of the truck box to be installed on the truck bed. The movable supports also guide the truck box onto or off of the truck bed.

The frame further comprises brackets corresponding to brackets on the truck box that interlock with one another when the truck box is completely mounted on the truck bed.

A method of extending or retracting a length of a truck bed of a truck to receive in succession truck boxes being first truck box and a second truck box, said truck boxes having different lengths, having a cab and a truck bed located to the rear of the cab uses a raised central portion on the truck bed. The central portion supports a frame that is connected to a rear of the central portion at a pivot point. At least one hydraulic cylinder extends between the central portion and the frame. The at least one cylinder is capable of tilting the frame rearward relative to the central portion. The truck bed has a winch with an extendable and retractable cable mounted thereon. Each truck box has attachment means thereon to receive the cable. The frame has guide means thereon and the box has guide means thereon corresponding to guide means on the frame. The frame has two movable supports that can be extended longitudinally to extend a rear of the truck bed or the movable supports can be retracted. The method comprises commencing with said truck boxes located on a supporting surface separate and apart from the truck, backing the truck towards the first truck box so that the truck is generally longitudinally aligned with the first truck box and the front of the first truck box faces the truck bed, tilting the frame upward and rearward relative to the truck bed, operating the winch to extend the cable and attaching the cable to the attachment means on the first truck box, retracting the winch to keep the cable taut, extending the movable supports and backing the truck closer to the first truck box while continuing to retract the cable to keep the cable taut, further extending the movable supports as necessary and continuing to back up the truck until a free end of the movable supports extends slightly within the guide means on the first truck box, retracting the winch further to tighten the cable and pull the first truck box closer to the truck along the movable supports, continuing to retract the cable to pull the truck box forward and upward relative to the truck until the guide means on the first truck box are engaged with the guide means on the frame, continuing to retract the cable to pull the first truck box onto the truck bed while lowering the frame until the front of the truck box is located immediately behind the cab and the frame has been lowered completely relative to the bed, adjusting a length of the movable supports so that a free end thereof extends substantially to a rear of the first truck box, subsequently reversing the method to remove the first truck box from the truck bed, repeating the method to install the second truck box on the truck bed and adjusting the movable supports so that a free end thereof extends substantially to the rear of the second truck box, subsequently reversing the method to remove the second truck box from the truck bed.

DESCRIPTION OF A PREFERRED EMBODIMENT

Figure 1:
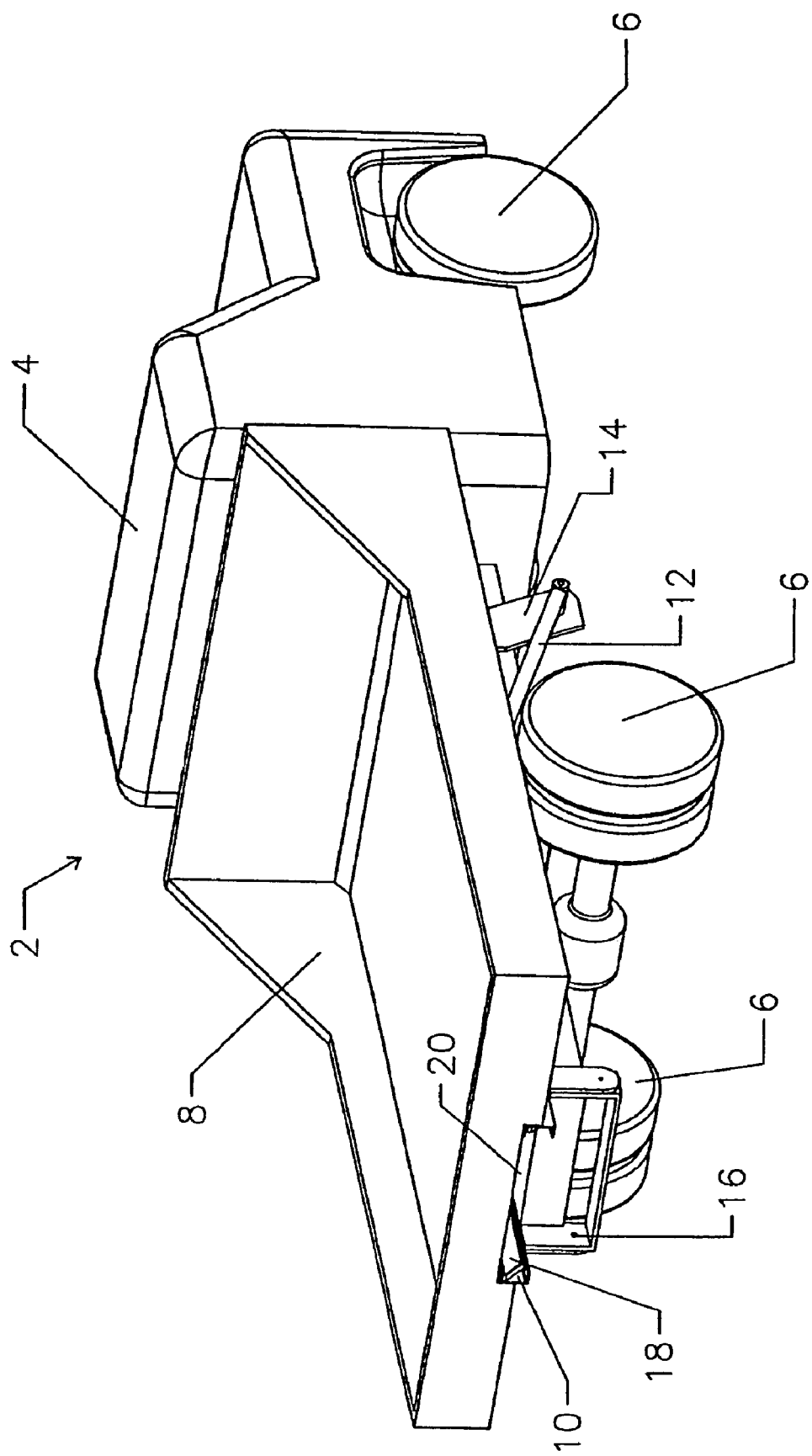
FIG. 1 is a perspective view of a truck having a removable truck box mounted thereon.

In FIG. 1, there is shown a perspective view of a truck 2 having a cab 4 and wheels 6 with a truck box 8 removably mounted on a frame 10 of a truck bed (not shown in FIG. 1). The truck bed has a hydraulic cylinder 12 mounted on a bracket 14 between the truck bed and the frame 10. The frame 10 is pivoted at a pivot point 16 to the truck bed. Extendable and retractable movable supports 18 are located within the frame 10. The truck box 8 has a centrally located longitudinal channel 20 therein. The channel 20 can be located as shown where it is partially cut into the truck bed frame surrounding the truck bed or it could be located entirely beneath the truck bed frame. Preferably, the channel is always located beneath the floor of the truck bed so as not to cause a ridge down the centre of the floor.

Figure 2:
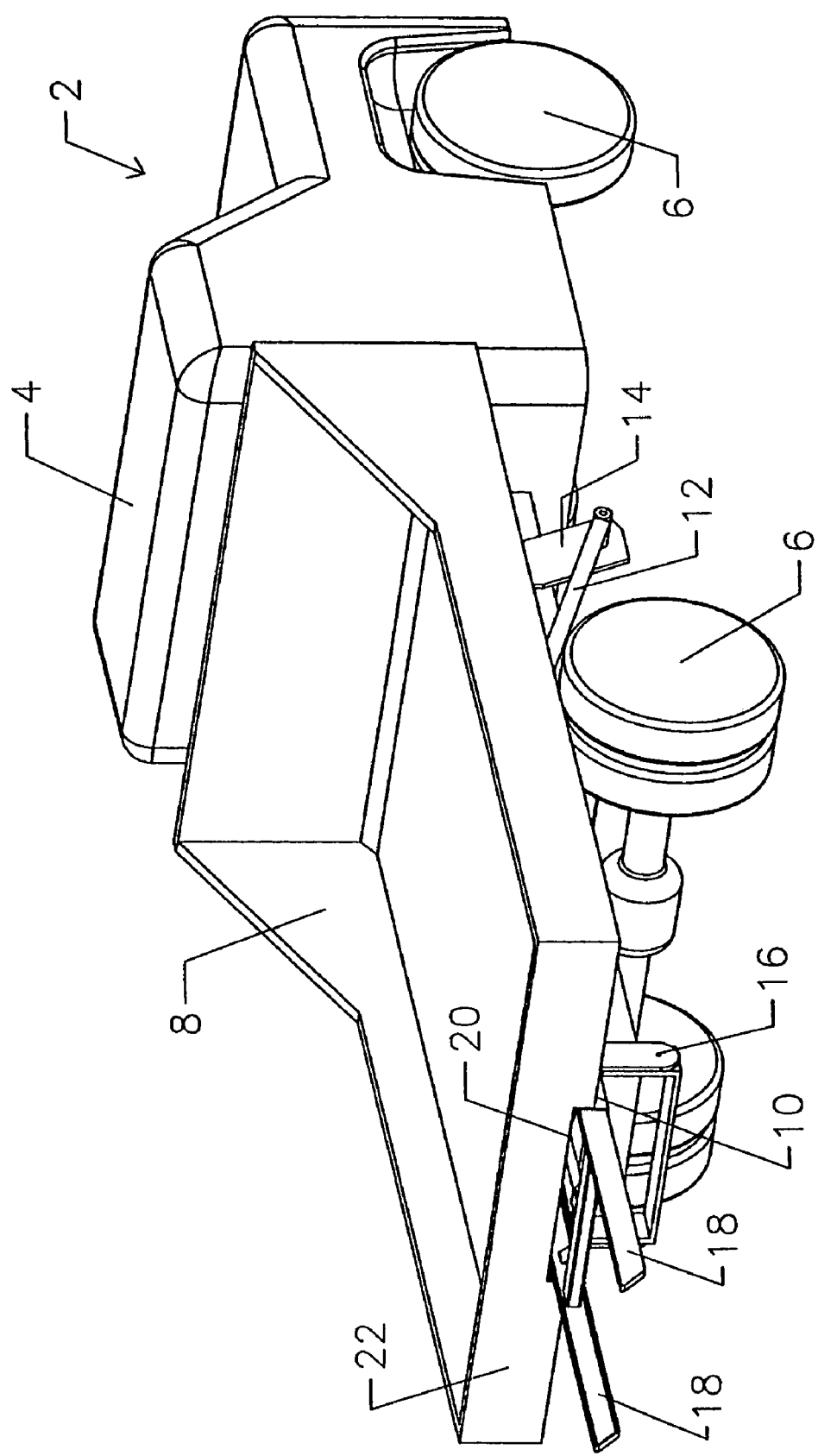
FIG. 2 is a perspective view of the truck of FIG. 1 with the movable supports extended.

In FIG. 2, the truck 2 is identical to the truck in FIG. 1 except that the movable supports 18 are extended. The same reference numerals are used in FIG. 2 and subsequent drawings to describe the same components as described in FIG. 1 without further explanation unless otherwise indicated. It can be seen that the movable supports 18 extend horizontally beyond a rear 22 of the truck box 8.

Figure 3:
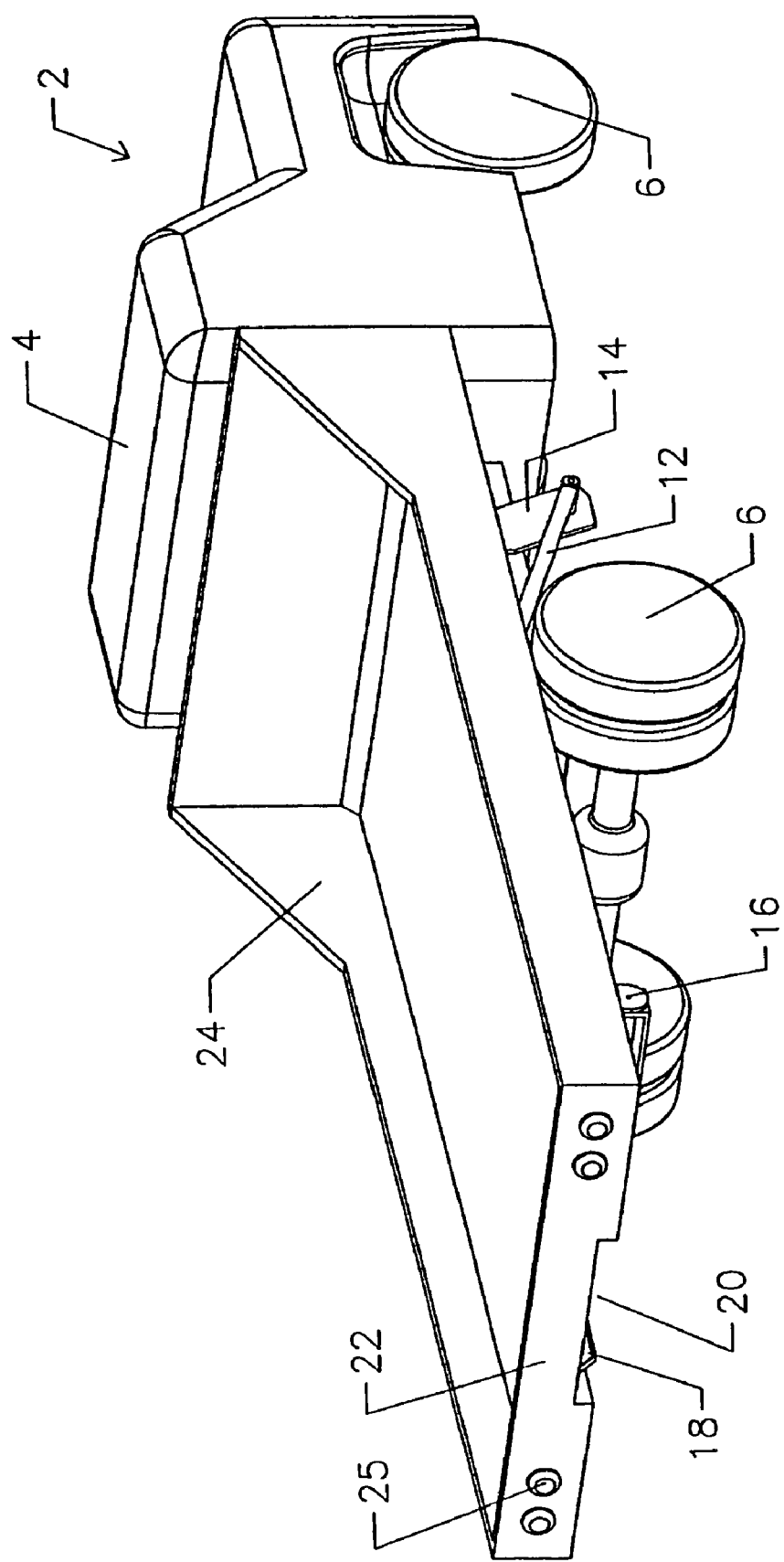
FIG. 3 is a perspective view of a truck having an extended truck box mounted thereon.

In FIG. 3, there is shown a perspective view of the truck 2 with an extended box 24 removably mounted thereon in place of the box 8. With the extended box 24, the movable supports 18 remain in the extended position shown in FIG. 2. Thus, the same truck can have either a standard length truck box 8 or an extended length truck box 24 removably mounted thereon with a rear portion of the box supported by the frame with both boxes. The movable supports are an extension of the frame. The extended truck box 24 has taillights 25 mounted on a rear 22 thereof.

Figure 4:
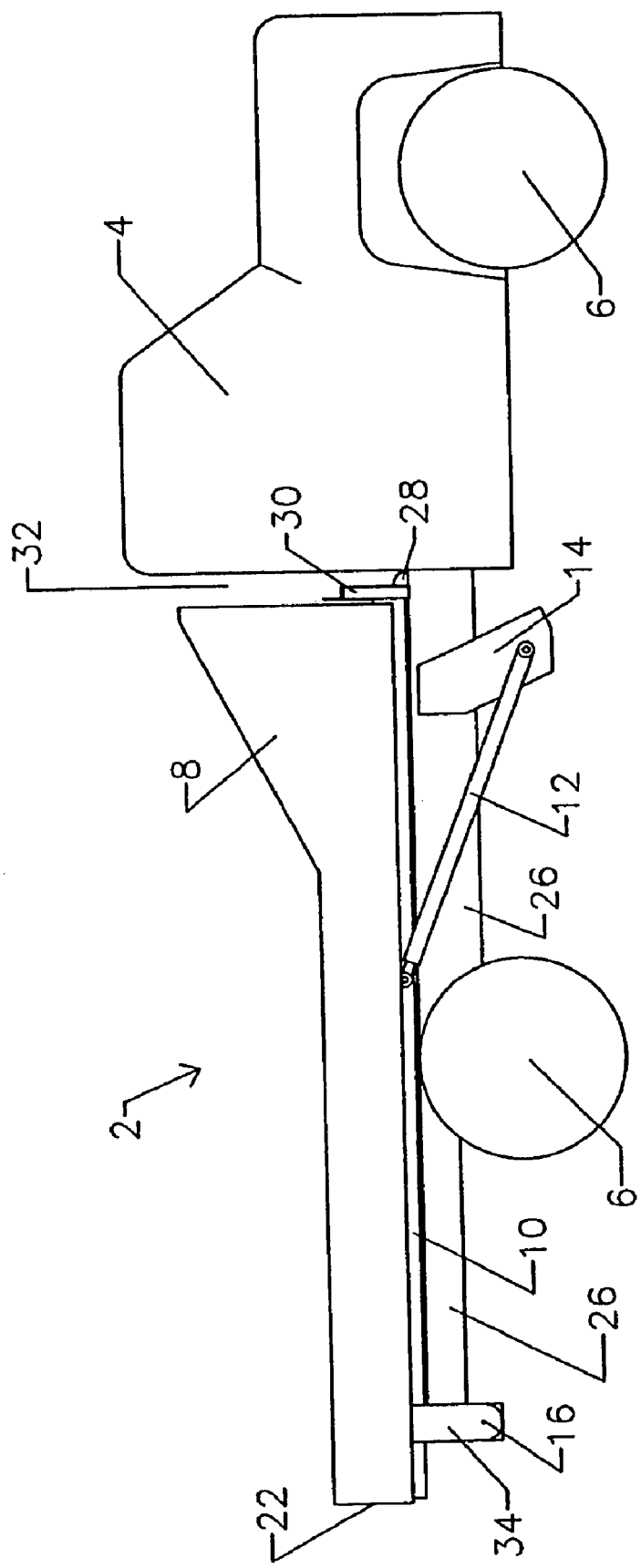
FIG. 4 is a side view of the truck of FIG. 1.

In FIG. 4, there is shown a side view of the truck 2 of FIG. 1. A truck bed 26 can be seen beneath the truck box 8. The same reference numerals are used in FIG. 4 as those used in FIG. 1. The frame 10 extends longitudinally between the truck box 8 and the truck bed 26. The bracket 14 is connected to the truck bed 26 and the hydraulic cylinder 12 extends between the bracket 14 and the frame 10. There is a second hydraulic cylinder on the other side (not shown) of the truck 2. A winch 28 is mounted at a front 30 of the frame 10. It can be seen that there is a small gap 32 between the cab 4 and the truck box 8. The pivot point 16 is surrounded by a bracket 34 that is rigidly connected to the frame 10. The front 30 of the frame 28 can be designed so that the winch is located beneath the frame 10 and the front 30 can then be moved closer to the cab 4 as can the truck box 8 to reduce the size of the gap 32 even further.

Figure 5:
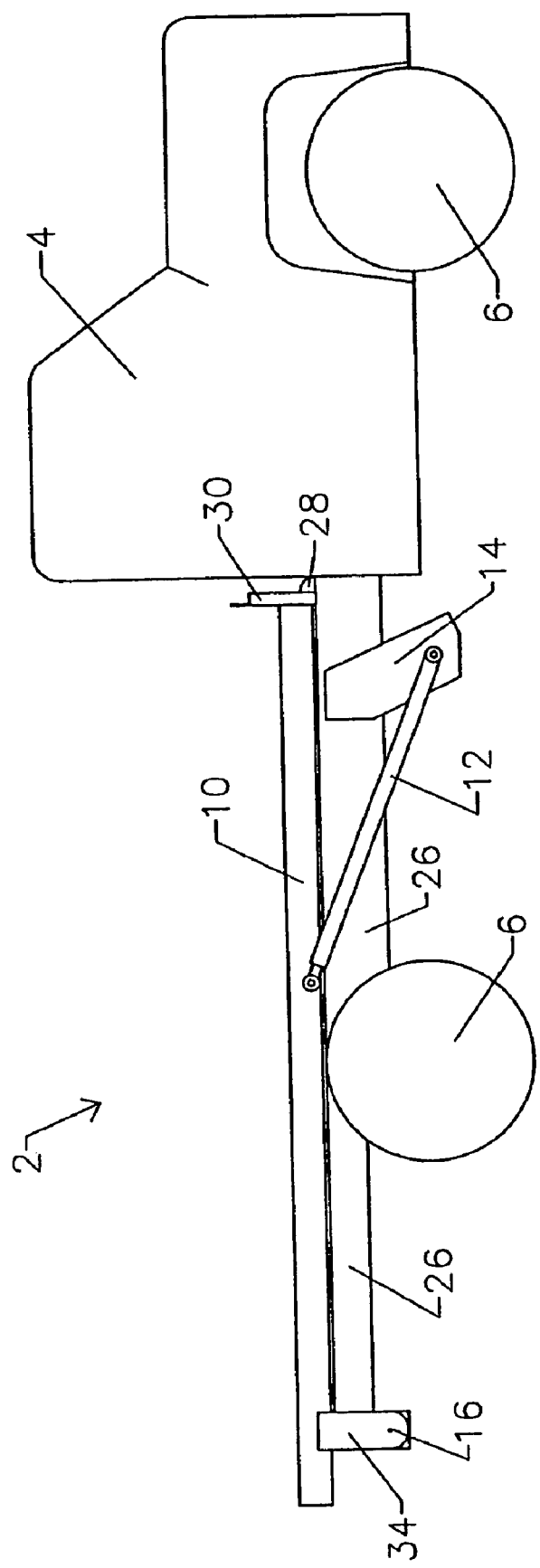
FIG. 5 is a side view of the truck of FIG. 1 with the box removed.

In FIG. 5, there is shown a side view of the truck 2 of FIG. 4 with a truck box 8 removed. The same reference numerals are used in FIG. 5 as those used in FIG. 4 to describe those components that are identical to the components of FIG. 5.

Figure 6:
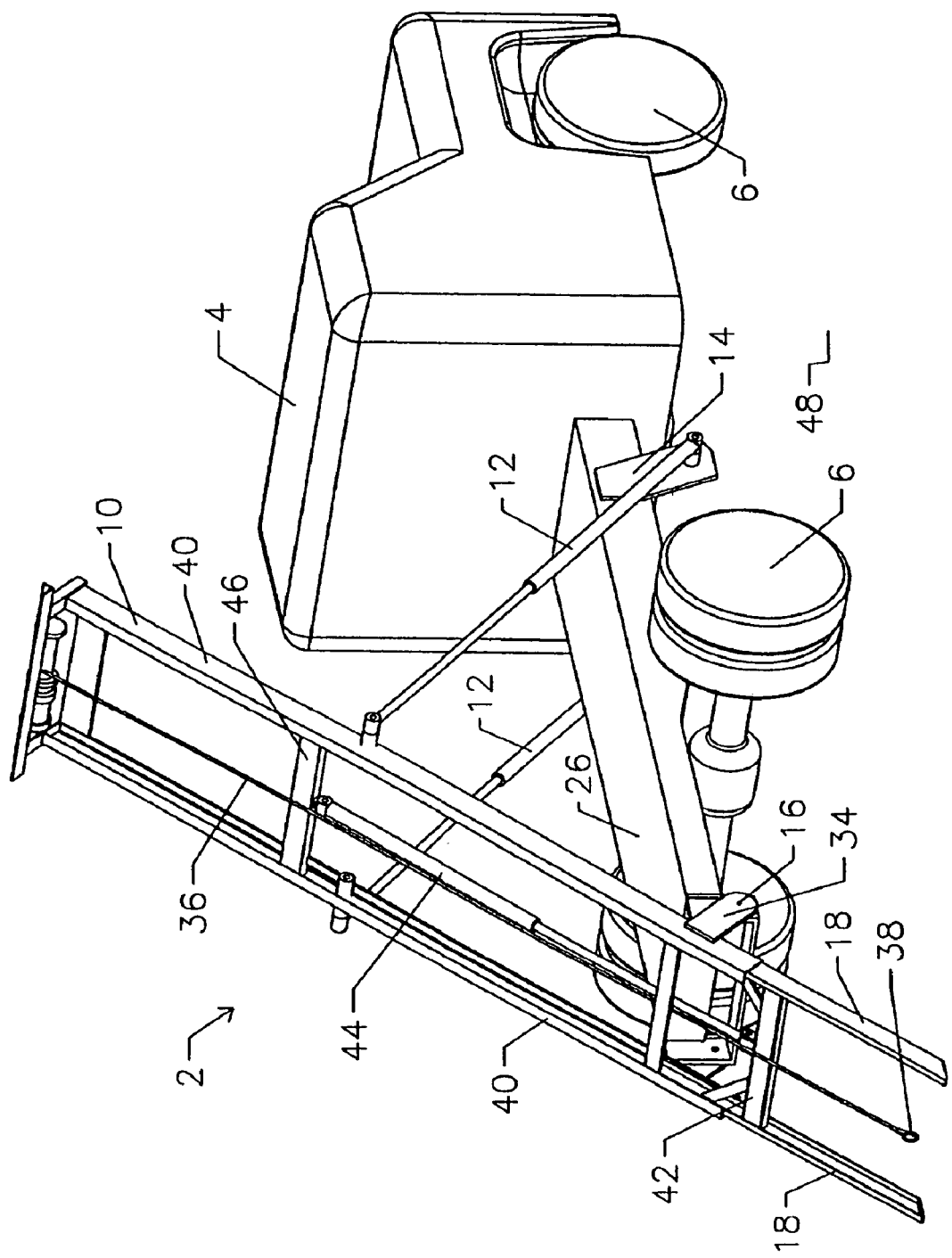
FIG. 6 is a perspective view of a truck with the box removed and a frame tilted rearward.

In FIG. 6, there is shown a truck 2 of FIG. 5 with the frame 10 tilted rearward about the pivot point 16. It can be seen that the winch 28 has an extendable and retractable cable 36 located thereon. The cable 36 has loop 38 which provides attachment means to attach the cable to a truck box (not shown in FIG. 6). It can be seen that the hydraulic cylinders 12 located on either side of the truck bed 26 are extended. The frame 10 has two longitudinal U-shaped side members 40. The movable supports 18 are mounted to slide within the U-shaped side members 40 and are connected by a cross member 42. A third hydraulic cylinder 44 is mounted between a cross member 46 and the cross member 42. When the hydraulic cylinder 44 is retracted or extended, the movable supports 18 are also retracted or extended respectively. The supports are shown in an extended position and preferably the movable supports are in contact with or in close proximity to a supporting surface 48 for the truck 2. Preferably, the hydraulic cylinders 12, the third hydraulic cylinder 44 and the winch 28 are all connected to be controllable within the cab 4. The channel 20 (not shown in FIG. 6) of the truck box 8 (not shown) is sized to straddle the side members 40 of the frame 10 when the truck box is either loaded onto or removed from the frame 10. The reference numerals used in FIG. 6 are the same reference numerals as those used in the remaining figures to identify the same components.

Figure 7:
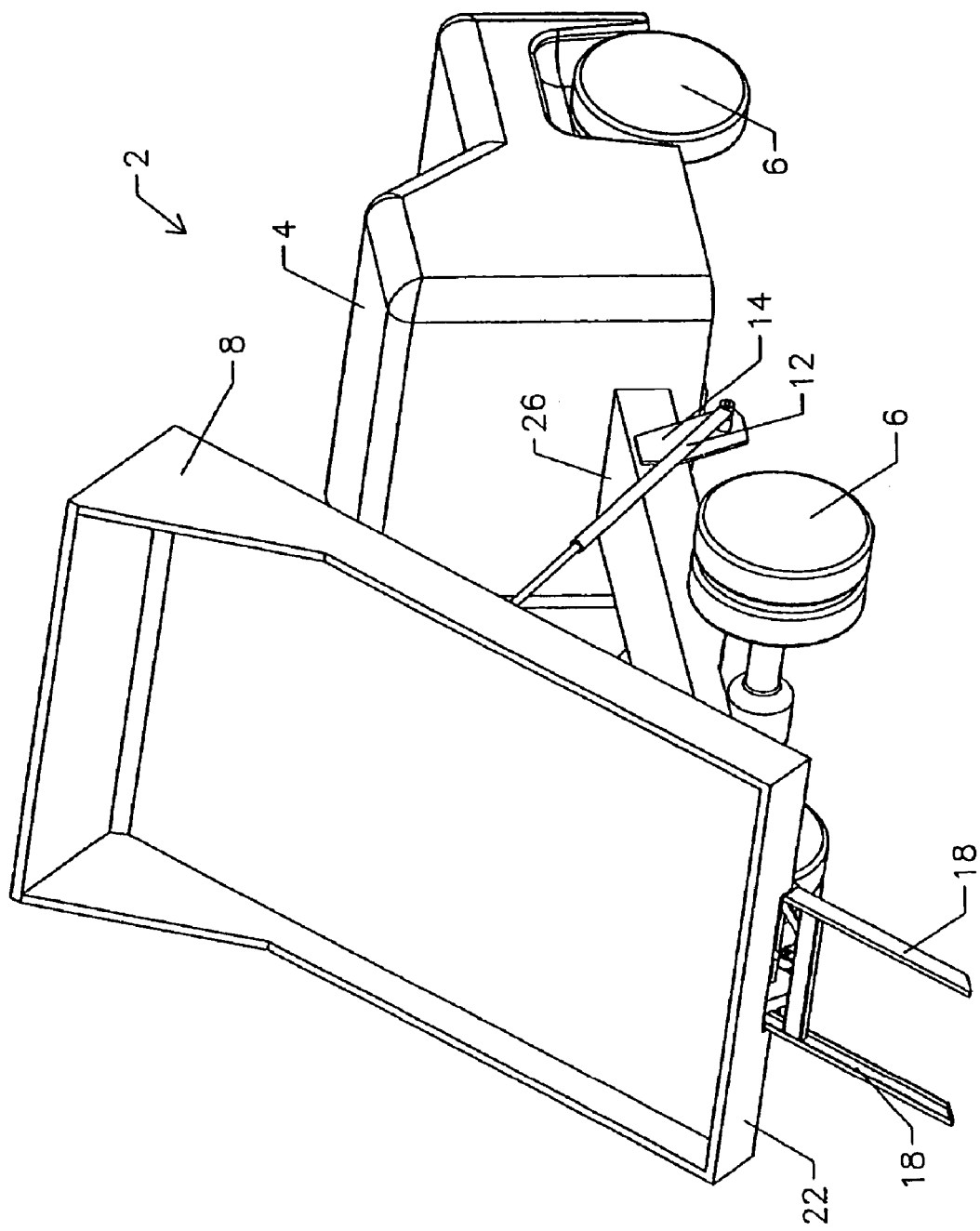
FIG. 7 is a perspective view of a truck having a box with the box and frame tilted rearward.
Figure 8:
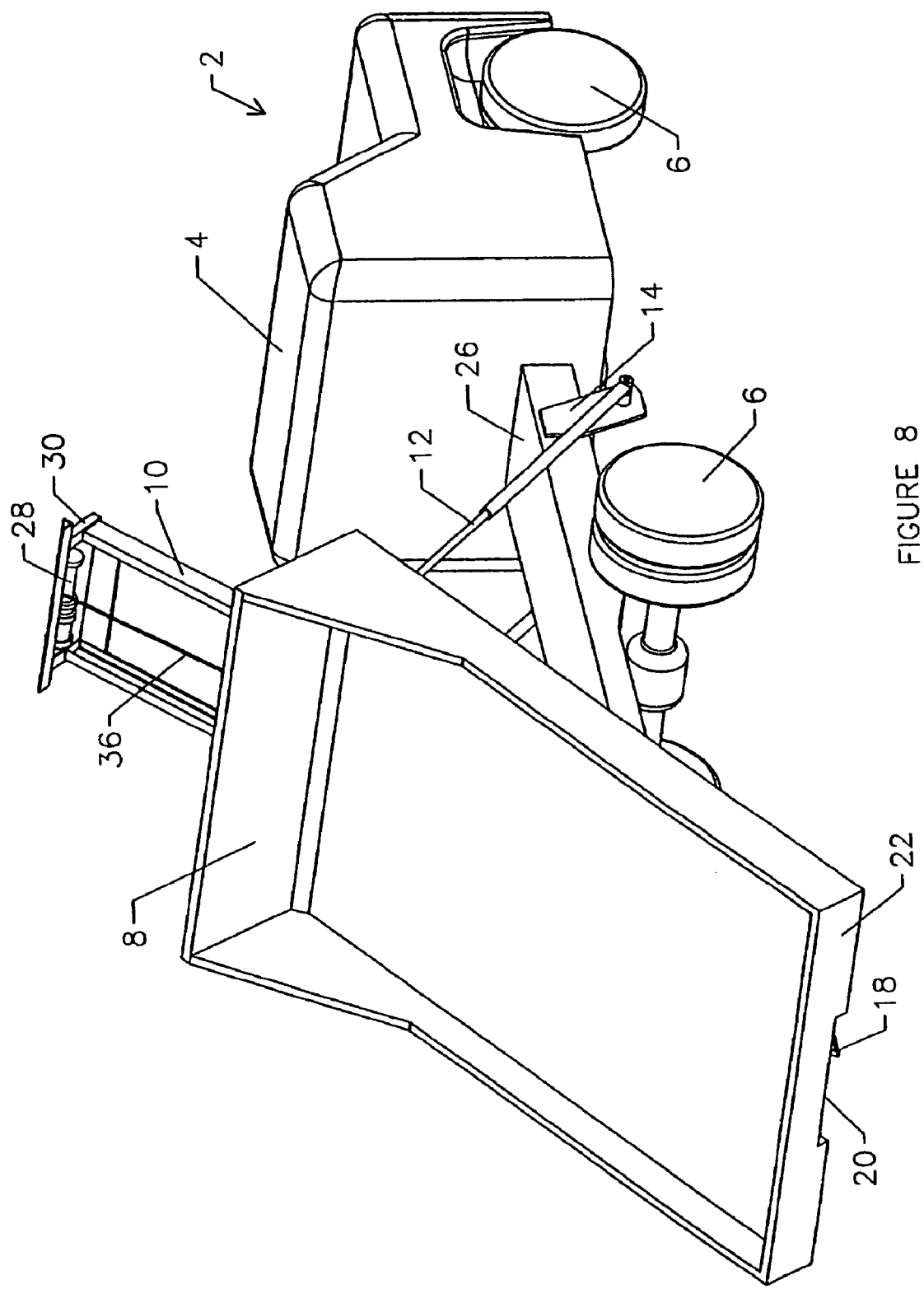
FIG. 8 is a perspective view of a truck shown in FIG. 7 with the box partially removed.
Figure 9:
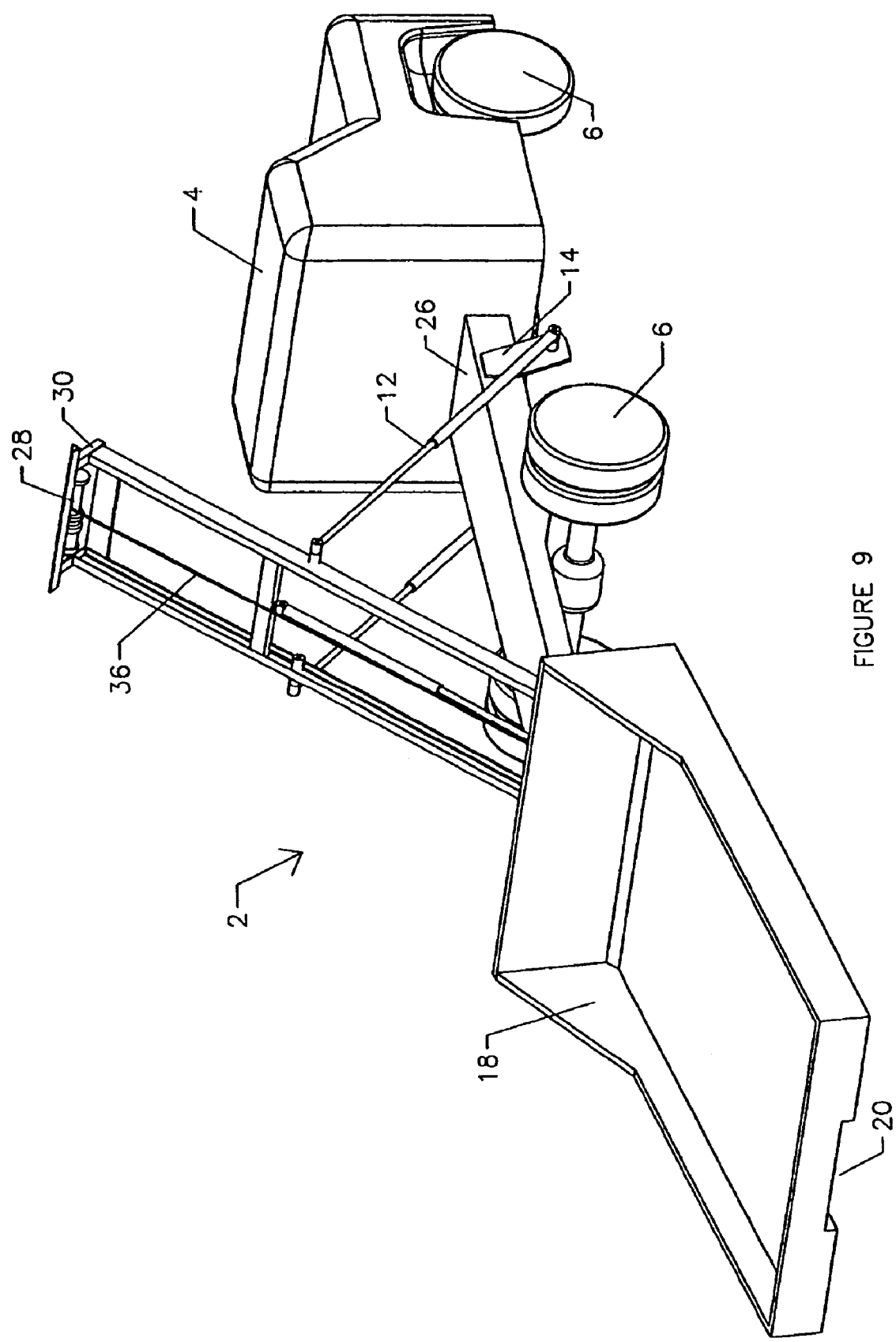
FIG. 9 is a perspective view of a truck shown in FIG. 8 with the box further removed.
Figure 10:
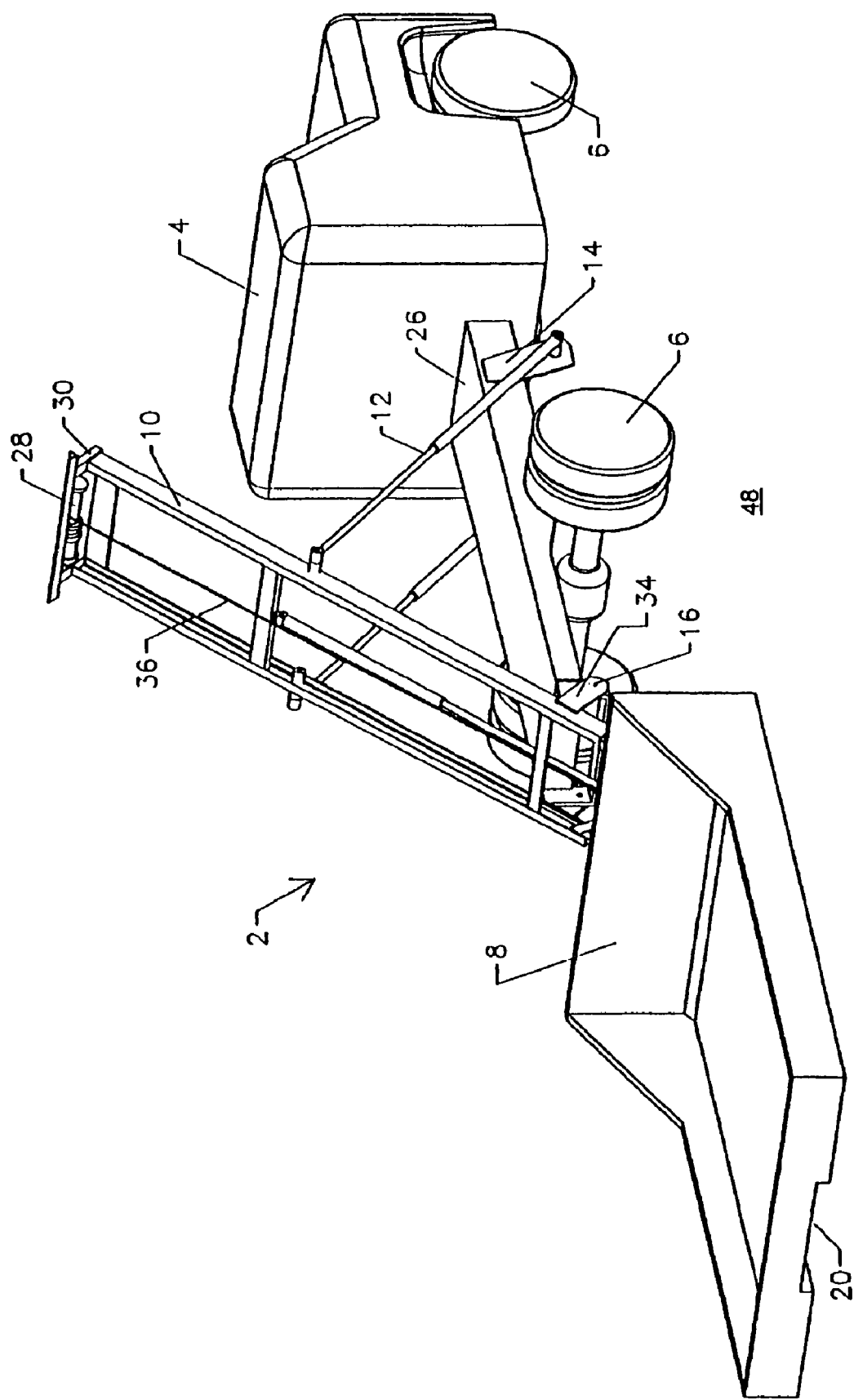
FIG. 10 is a perspective view of a truck shown in FIG. 9 with the box completely removed from the frame.

In FIG. 7, the truck box 8 and frame 10 (not shown) are tilted rearward with the movable supports 18 being extended to the supporting surface 48. To unload the box 8 from the truck bed 26, the frame 10 is tilted rearward as shown in FIG. 8. The movable supports 18 are extended and the winch 28 is operated to extend the cable 36. The truck box 8 then slides rearwardly along the frame 10 with the channel 20 straddling the side members 40. In FIG. 9, the cable has been extended further and the truck box 8 is almost completely removed from the frame 10 and truck bed 26. In FIG. 10, the cable 36 is still connected but the truck box 8 is resting on the supporting surface 48. Except for the cable 36, the truck box 8 is completely separate from the truck 2. The last step in the removal procedure is that the cable 36 is detached from the truck box 8. To load the truck box 8 onto the truck frame 10 and truck bed 26, the cable is first connected to the truck box, the movable supports are extended and the truck is maneuvered so that it is longitudinally aligned with the truck box. The cable is then tightened slowly to draw the truck box onto the frame 10 as shown in FIGS. 9, 8, and 7. As the truck box is pulled onto the frame 10, the frame 10 can be lowered toward the truck bed 26. As the frame 10 is lowered, it is easier for the winch to pull the truck box onto the frame 10 until the front of the truck box contacts the front 30 of the truck 2.

Figure 11:
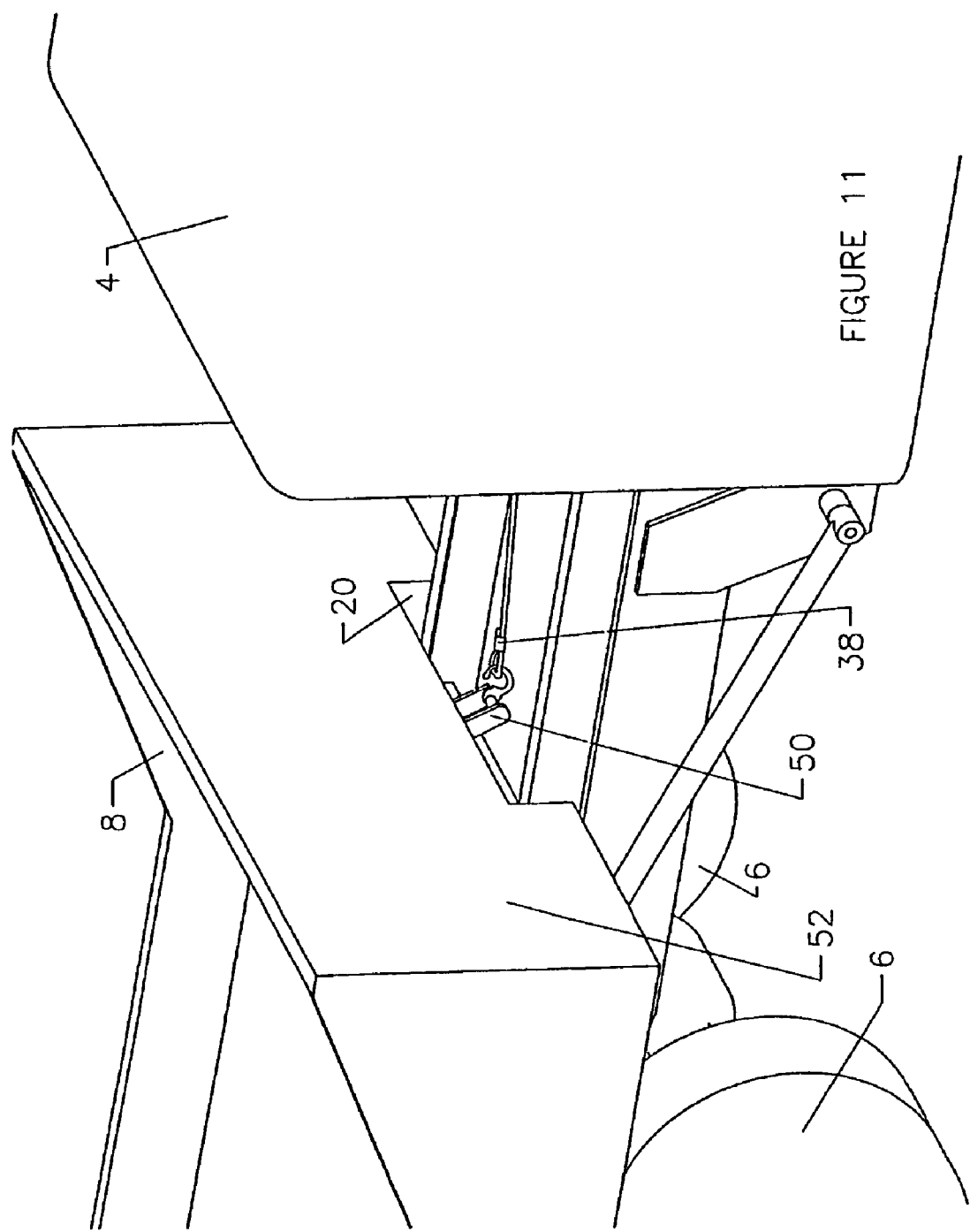
FIG. 11 is a partial perspective view of a truck having truck box that is not fully installed on the truck bed.

In FIG. 11, it can be seen that the loop 38 is connected to a hook 50 at a front 52 of the truck box 8.

Figure 12:
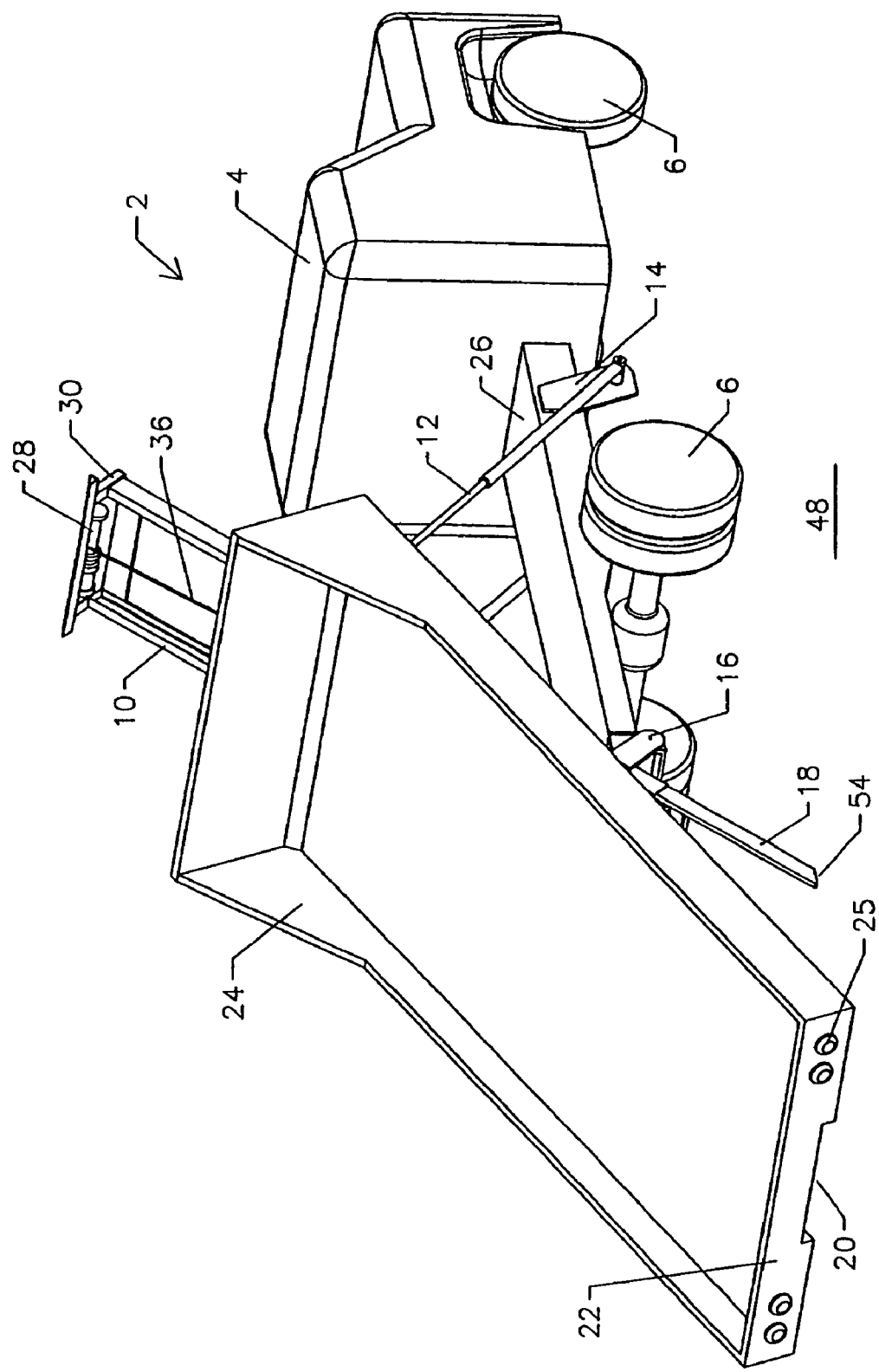
FIG. 12 is a perspective view of an extended box that is partially removed from a truck bed.

In FIG. 12, the extended box 24 is shown to be partially removed from the truck 2. Since the extended box 24 extends to a free end 54 of the extended movable supports 18 when the box is fully mounted in the operating position on the truck 2, when the frame 10 is tilted rearward, the rear 22 of the box 24 will touch the supporting surface 48. The truck 2 is then moved forward as the winch 28 is operated to unwind or extend the cable 36. The truck is continued to be moved forward slowly and the cable is continued to be extended until the extended truck box 24 rests entirely on the supporting surface 48 separate from the truck 2.

Figure 13:
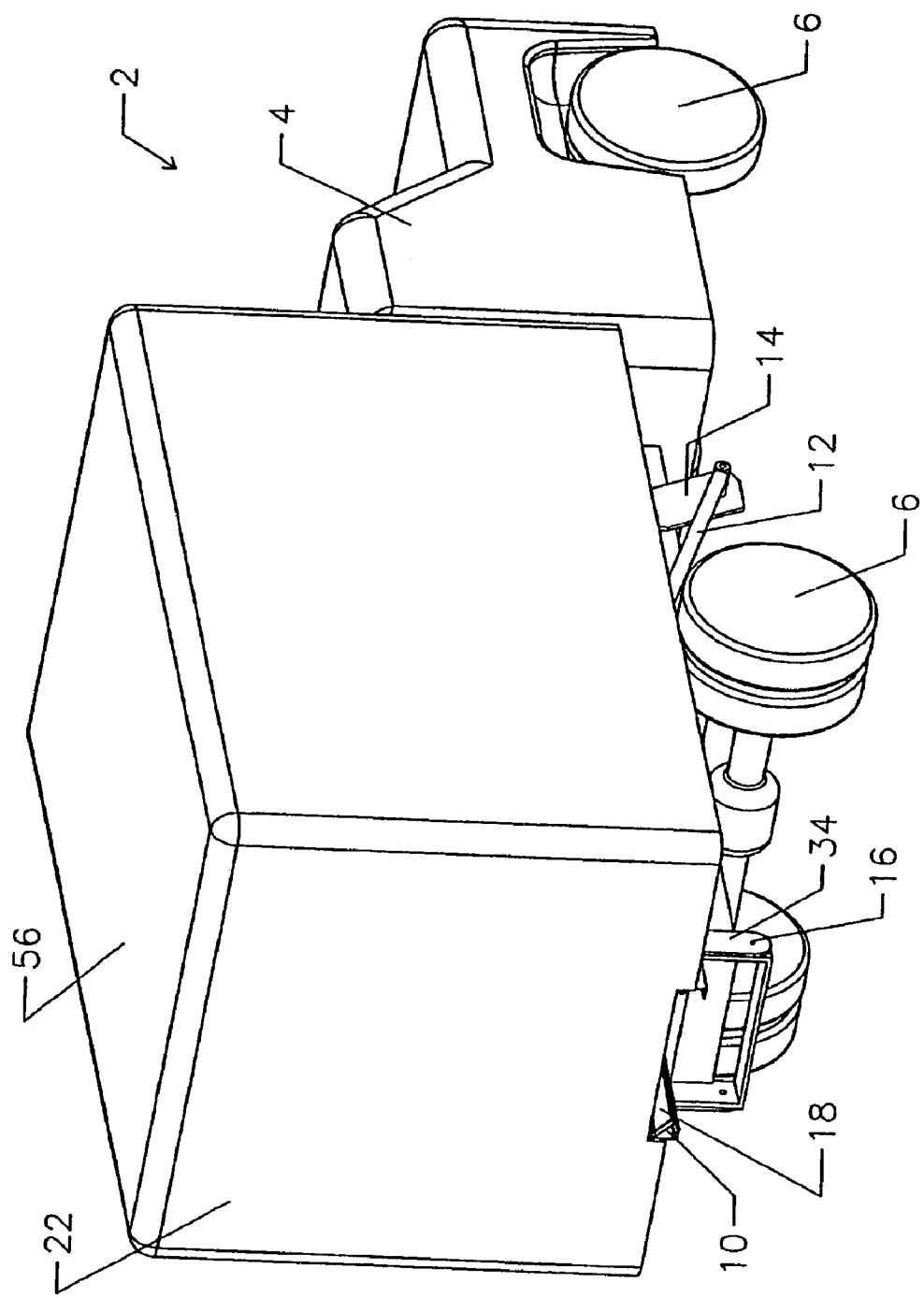
FIG. 13 is a perspective view of a removable cube box mounted on a truck.

In FIG. 13, there is shown a cube box 56 having a regular length that extends just beyond the frame 10.

Figure 14:
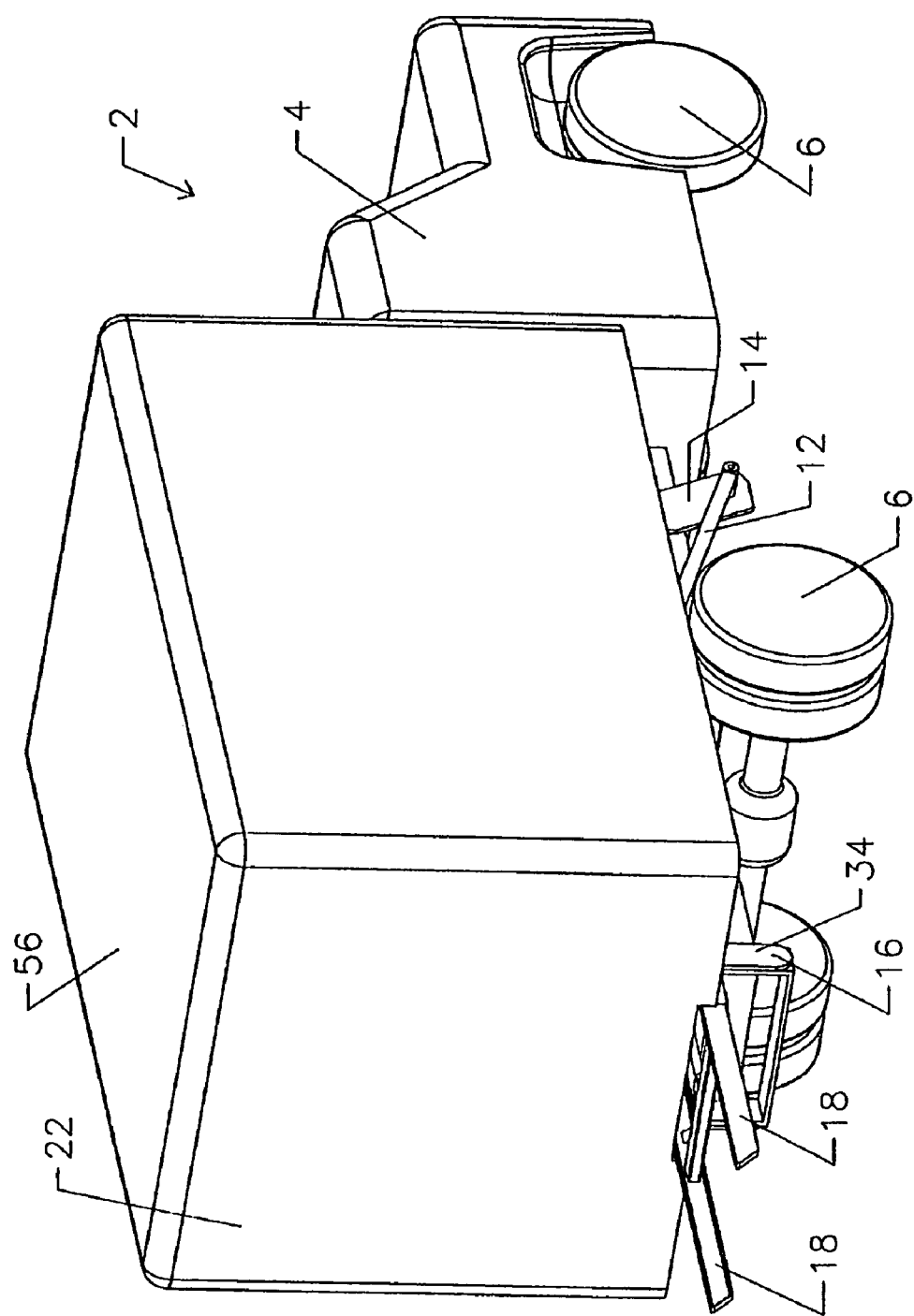
FIG. 14 is a perspective view of the truck of FIG. 13 with the movable supports extended.

In FIG. 14, the movable supports 18 are extended and extend beyond a rear 22 of the cube box 56.

Figure 15:
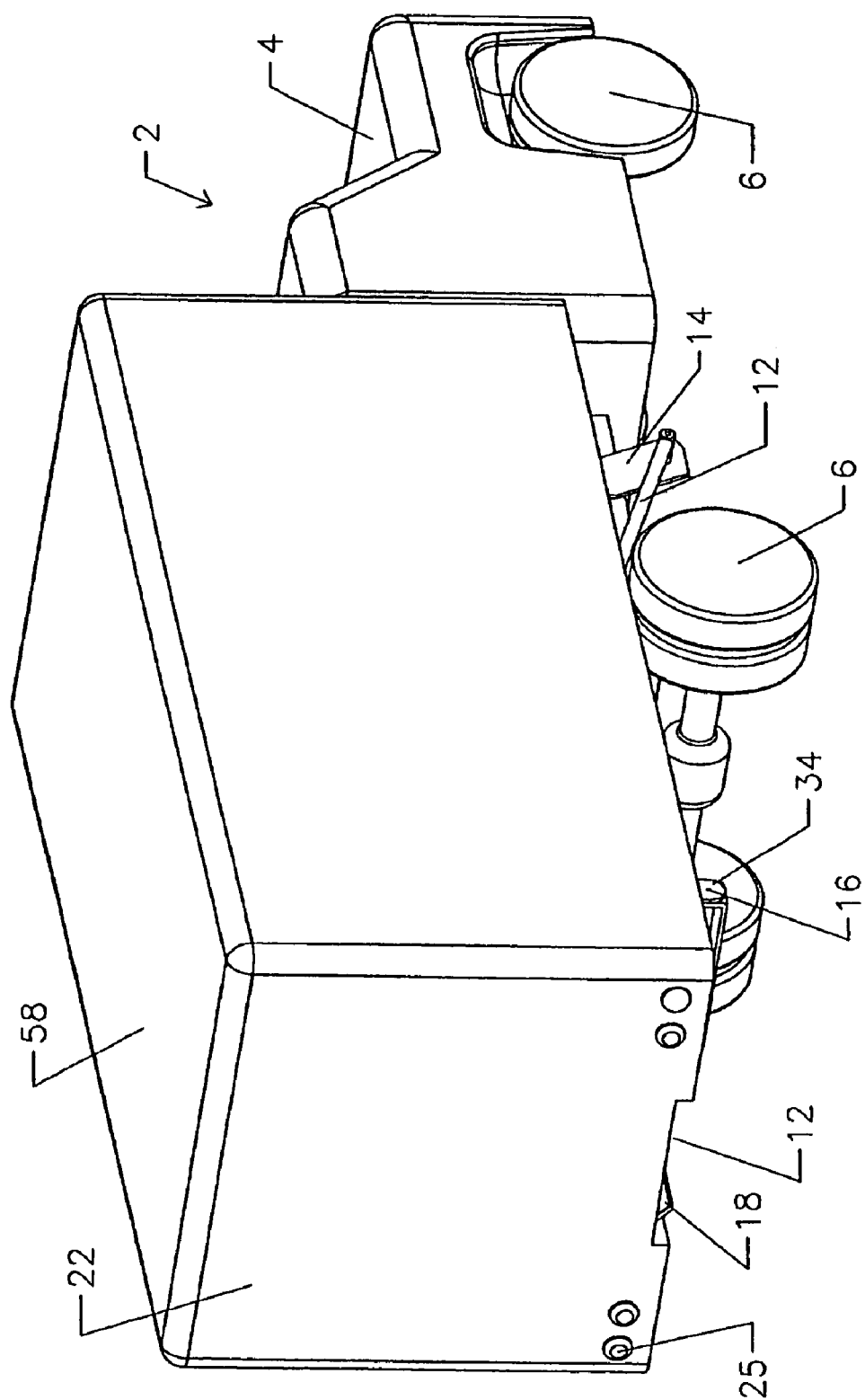
FIG. 15 is a perspective view of an extended cube box mounted on a truck.

In FIG. 15, an extended cube box 58 is mounted on the truck 2 with the movable supports 18 remaining in the extended position shown in FIG. 13.

Figure 16:
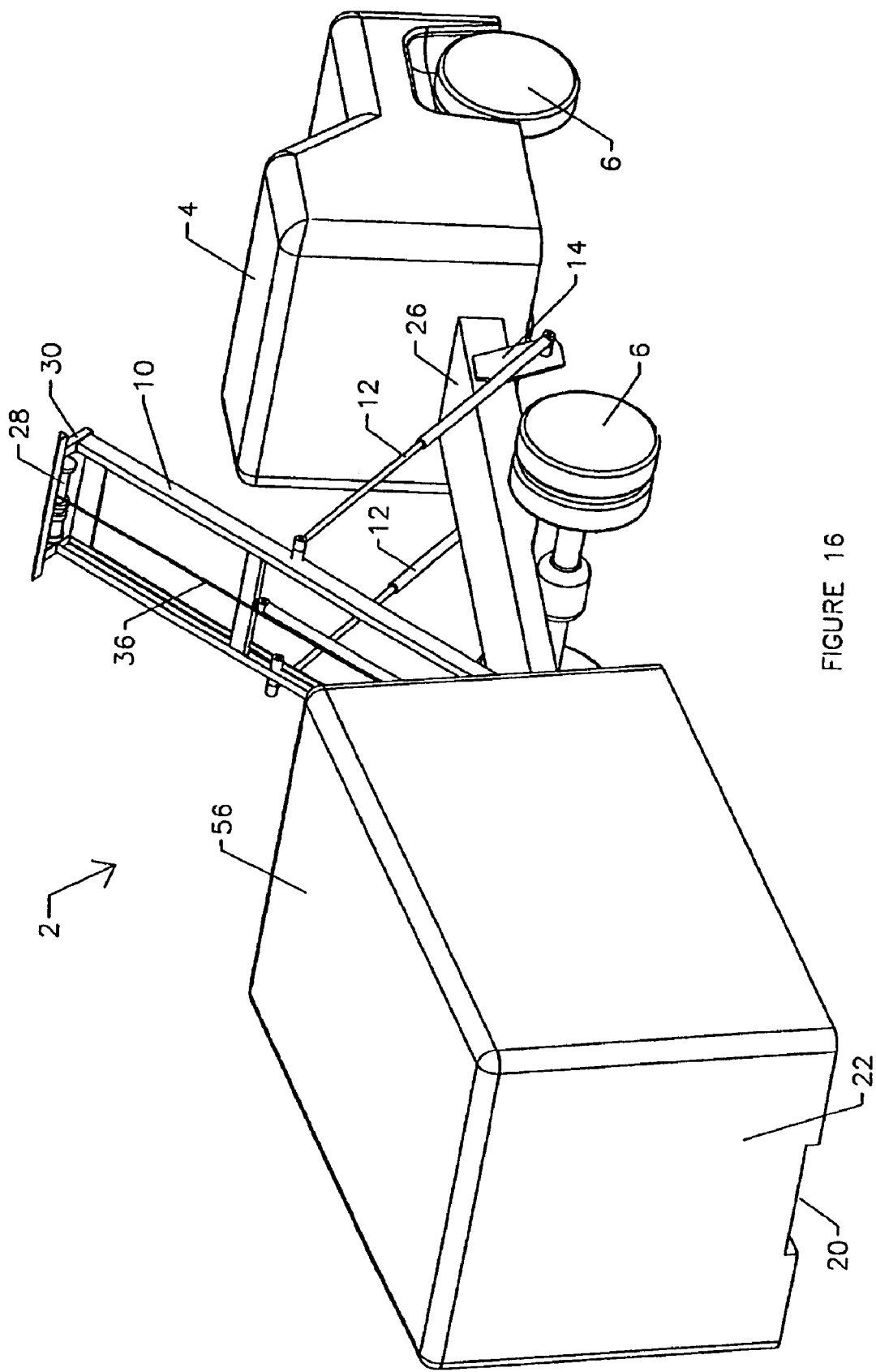
FIG. 16 is a perspective view of a cube box that is almost completely removed from the truck.

In FIG. 16, the cube box 56 is shown in a position so that it is almost completely removed from the truck 2.

Figure 17:
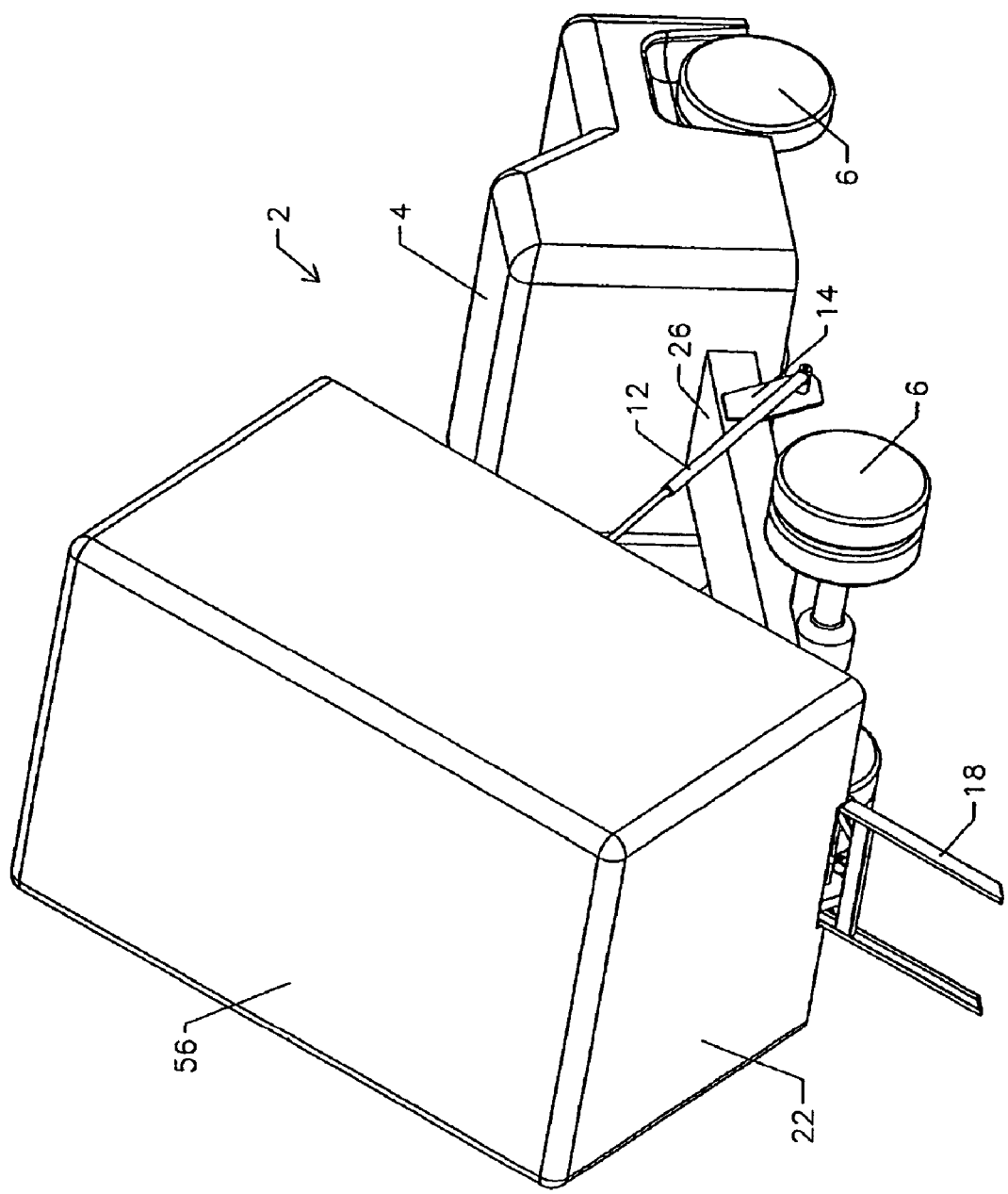
FIG. 17 is a perspective view of a truck where the cube box and frame are tilted backward.

In FIG. 17, the cube box 56 is shown to be fully mounted on the frame 10 with the frame tilted rearward and the movable supports 18 extended.

Figure 18:
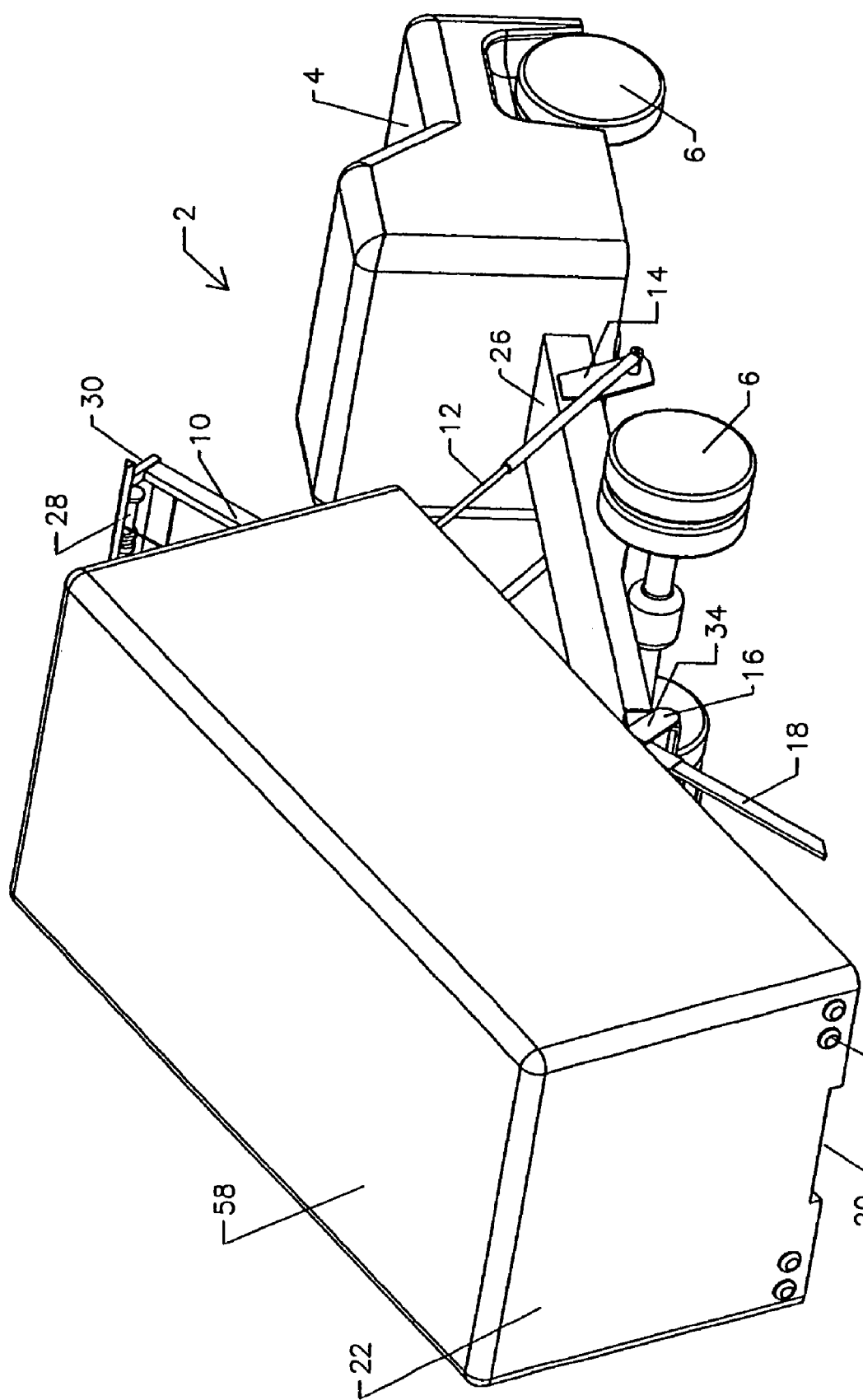
FIG. 18 is a perspective view of a truck where the extended cube box is partially removed from the truck; and, FIG. 19 is an enlarged view of a portion of FIG. 4 schematically illustrating interlocking brackets on the frame and the box.

In FIG. 18, the extended cube box 58 is shown to be partially removed from the frame 10. The extended cube box 58 is removed in the same manner as the extended truck box 24. To load either the extended truck box 24 or the extended cube box 58, the movable supports 18 are extended and the truck is backed into position so that it is longitudinally aligned with the truck box. The cable is then connected to the front of the truck box and the cable is retracted or wound to pull the truck box onto the fame 10 with the size of the channel 20 of the truck box straddling the side members 40 of the frame. As the truck box 24 or the truck box 58 advances onto the frame 10 in the approximate positions shown in FIGS. 12 and 18, the frame is lowered toward the truck bed until the front of the truck box is pulled into contact with the front 30 of the frame 10.

Figure 19:
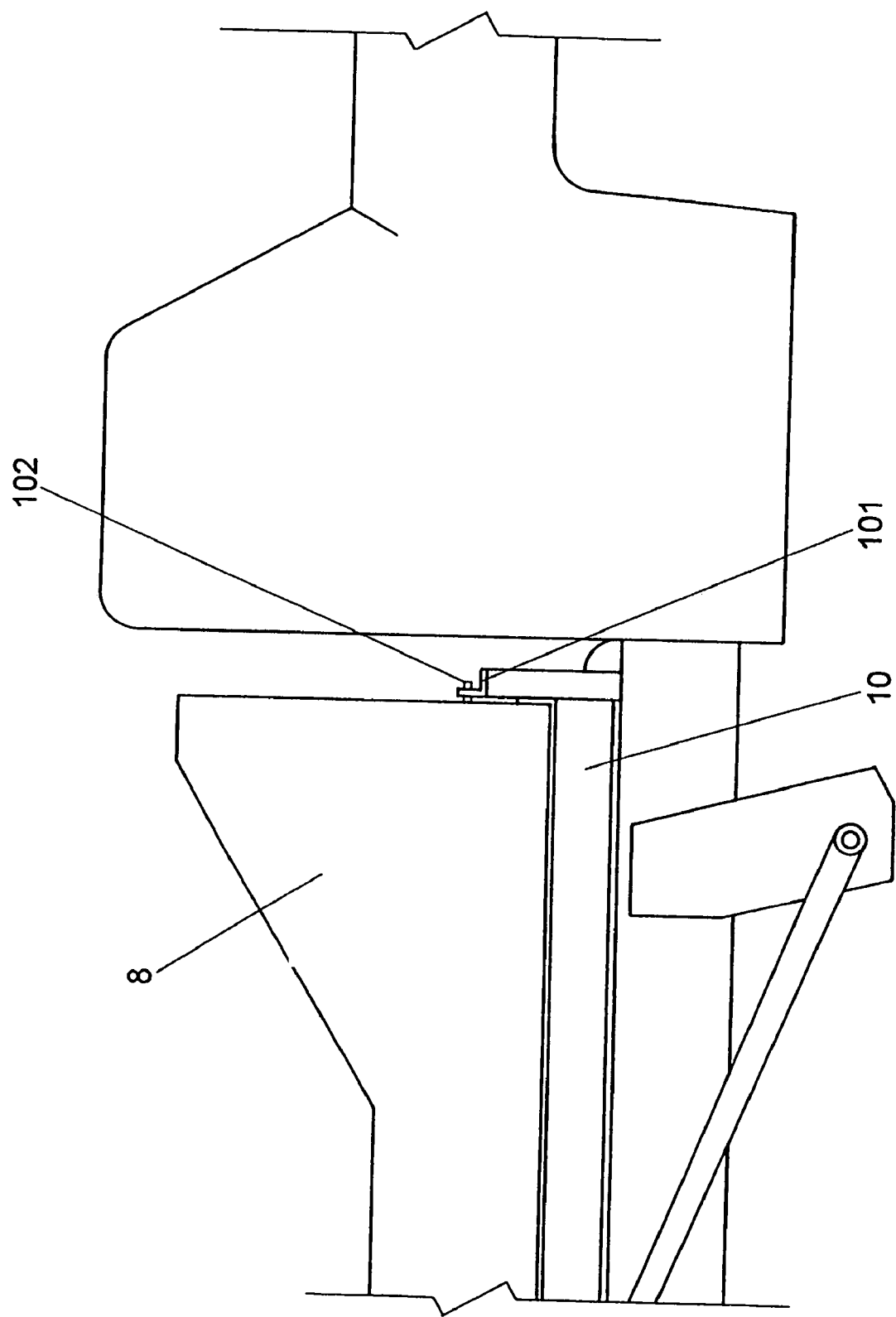

In FIG. 19, a bracket 101 on frame 10 interlocks with a bracket 102 on truck box 8 when the box is completely mounted on the truck.

In the drawings, there are four different boxes shown, being the open box 8, the extended open box 24, the cube box 56 and the extended cube box 58. Numerous other variations and shapes of boxes can be designed to be removably mounted onto the frame 10 and the truck bed 26. For example, the truck box could have a shape similar to that of a dump truck with higher side walls than the box 8. Since the hydraulic cylinders 12 are available to tilt the frame 10 upward or downward about the pivot point 16, the truck can then be operated in the same manner as a dump truck can be operated. As another example, the truck box could be a camper that has kitchen and sleeping facilities built into it.

As another example, the truck box could have various items such as snowmobiles mounted thereon. The truck box including the snowmobiles can then be mounted or removed from the truck bed. The snowmobiles could be driven onto or off of the truck box while it is resting on the supporting surface. The truck box could be used to load or unload welding equipment in the same manner. The truck box could be designed to be a waste materials bin that could be divided into one or more subsections. Thus, it can be readily seen from the drawings and from the description, one truck can have a variety of uses simply by loading a particular type of box onto the truck. A rental agency could have several different sizes and shapes of boxes and a much lesser number of trucks so that a customer would have a choice of boxes at the time of rental. A particular customer might choose to rent two or more boxes during one rental period and use them, one at a time, on the truck body. Of course, the truck is much more expensive than the truck boxes in most cases and there is therefore substantial cost saving in being able to have a variety of truck boxes mounted successively on a truck bed.

Preferably, the truck boxes and frame are electrically wired so that the lights on the extended truck box will be automatically connected into the electrical system of the truck when the extended truck box is properly installed on the truck bed. The taillights (not shown) are installed on the frame and are suitably located when a truck bed has a standard length truck box mounted thereon. However, when the truck bed has an extended length truck box thereon, the taillights on the frame are too far underneath the truck bed to be readily seen. Therefore, extended length truck boxes have taillights mounted on a rear surface thereof. Of course, taillights are deemed to include brake lights and back up lights.

In one embodiment, the taillights are automatically connected. In another embodiment, the extended length boxes have wiring (not shown) thereon that must be manually connected to wiring (not shown) on the frame in order to connect the taillights on the extended length box to the electrical wiring of the truck.

While only standard length truck boxes of one length and extended length truck boxes of another length are shown in the drawings, the present invention has the flexibility to receive truck boxes having lengths between the regular length and the extended length. The movable supports can be extended or retracted so that when the truck is in a travel mode, a free end of the movable supports is located substantially beneath a rear surface of the truck boxes.

The invention claimed is:

1. A system for transporting a variety of boxes, the system comprising:
   (i) a truck having a cab and a truck bed to a rear of the cab, the truck bed comprising an extendible frame pivotally mounted on the truck bed, the extendible frame capable of being tilted rearward for loading or unloading the boxes, the frame having two hollow longitudinal side members within which movable supports are extendably and retractably fitted, each movable support having a rearmost end located wholly within its respective longitudinal side member, the movable supports both for guiding the boxes onto and off of the frame and for supporting boxes that exceed a minimum length of the frame; and,
   (ii) a variety of boxes designed for different uses, each box having guide means thereon corresponding to guide means on the frame, and each box being removably mountable on the frame.

2. The system according to claim 1, wherein the guide means on each box is a centrally located channel extending longitudinally beneath each box and the guide means on the frame are the longitudinal side members of the frame, whereby the channel straddles the side members when each box is mounted on the frame.

3. The system according to claim 1, wherein the truck bed comprises a winch having an extendable and retractable cable mounted thereon for pulling each box on to the frame.

4. The system according to claim 3, wherein each box has an attachment for receiving the cable.

5. The system according to claim 1, wherein the frame has a bracket corresponding to a bracket on box, the brackets interlocking with one another when each box is completely mounted on the frame.

6. The system according to claim 1, wherein at least one of the boxes is a camper, a welding station or a waste material bin.

7. The system according to claim 1, wherein at least one of the boxes is an open box, an extended open box, a cube or an extended cube.

8. A system for transporting a variety of boxes, the system comprising a truck and a variety of boxes designed for different uses,
    wherein the truck comprises a cab and a truck bed located to a rear of the cab, the truck bed comprising:
    a raised central portion extending longitudinally;
    an extendible frame pivotally supported on the raised central portion and connected to a rear of the raised central portion at a pivot point, the frame having two hollow longitudinal side members within which movable supports are extendably and retractably fitted to extend or retract longitudinally a length of the truck bed both for guiding the boxes onto and off of the frame and for supporting boxes that exceed a minimum length of the frame;
    at least one hydraulic cylinder extending between the raised central portion and the frame for tilting the extendible frame rearward relative to the raised central portion for loading or unloading the boxes; and,
    a winch on the truck bed having an extendable and retractable cable mounted thereon,
    and wherein each box comprises an attachment means thereon to receive the cable from the winch, each box comprising a centrally located channel extending longitudinally beneath each box and straddling the side members of the frame, each box being removably mountable on the frame.

9. The system according to claim 8, wherein the frame has a bracket corresponding to a bracket on each box, the brackets interlocking with one another when each box is completely mounted on the frame.

10. The system according to claim 8, wherein at least one of the boxes is a camper, a welding station or a waste material bin.

11. The system according to claim 8, wherein at least one of the boxes is an open box, an extended open box, a cube or an extended cube.

* * * * *